July 10, 1928.
R. C. DUNKELBERG
1,676,891
APPARATUS FOR FILTERING AND SOFTENING WATER
Filed Nov. 11, 1927
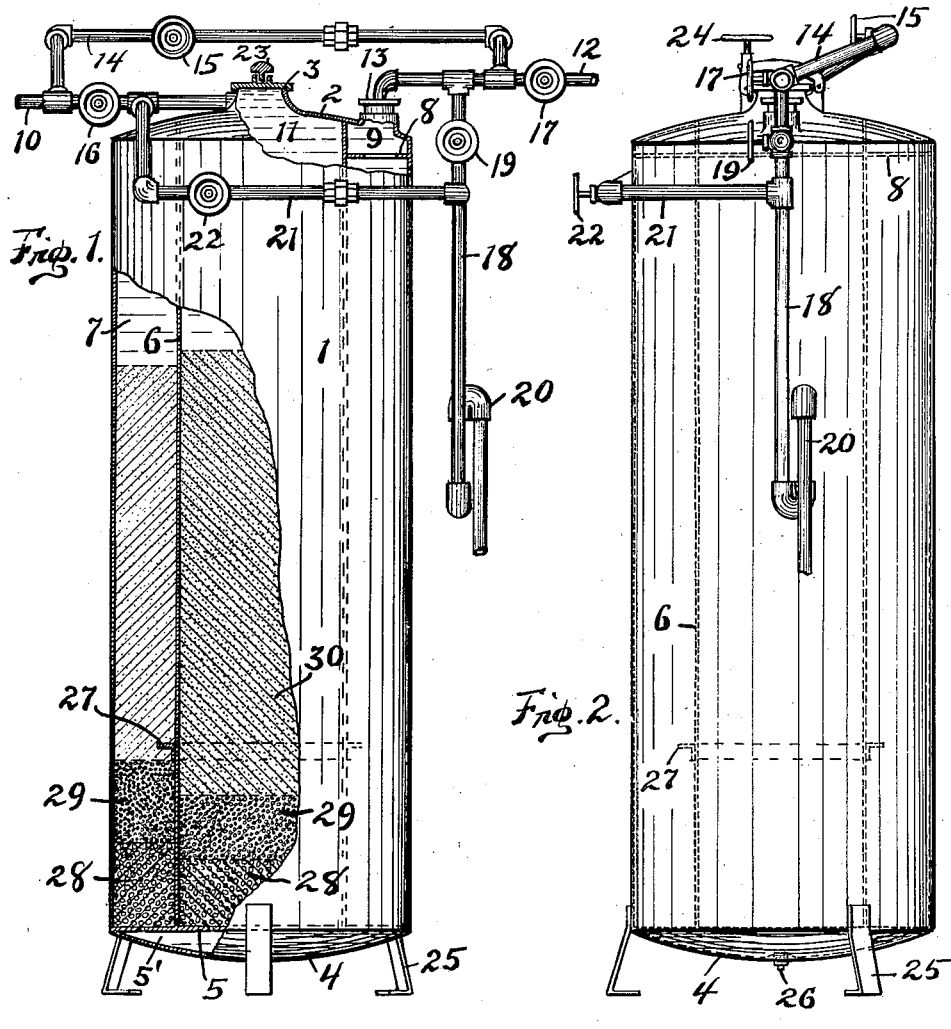
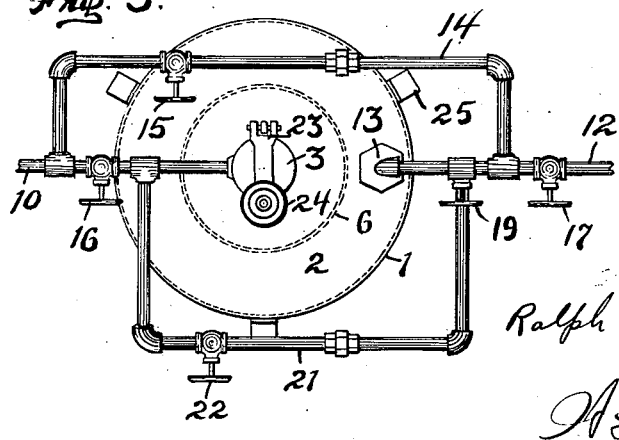
Ralph C. Dunkelberg INVENTOR
BY
A. G. Burns ATTORNEY Patented July 10, 1928.

1,676,891

UNITED STATES PATENT OFFICE.

RALPH C. DUNKELBERG, OF FORT WAYNE, INDIANA.

APPARATUS FOR FILTERING AND SOFTENING WATER.

Application filed November 11, 1927. Serial No. 232,563.

This invention relates to improvements in apparatus for filtering and softening water, and the objects thereof are: First, to provide a compact unit containing filtering material and water softening mineral so arranged as to admit of the filtering material being readily purged of accumulations of foreign matter, without interference or affecting the water softening mineral substance; and to admit of the regeneration of the water softening mineral substance without interference with the filtering materials; second, to so arrange the controls for the unit that operation thereof will be without complication and confusion thereby obviated; and third, to provide apparatus for filtering and softening water so constructed that the complete apparatus may be furnished and installed economically.

These objects are accomplished by the construction illustrated in the accompanying drawings, in which:—

Fig. 1 is a front elevation of a unit embodying the invention, portions thereof being broken away;

Fig. 2 is a side elevation projected from Fig. 1; and

Fig. 3 is a plan view projected from Fig. 1.

The characters appearing in the description refer to parts shown in the drawings and designated thereon by corresponding characters.

The invention consists of a tank, formed of a cylindrical shell 1 having a head 2 at its top, which head is provided with a removable cover 3 centrally located thereon, and which shell is closed at its lower end by another head 4.

Within the tank, spaced from the head 4, is a perforated partition 5 upon which is supported an inner shell 6 that is disposed in concentric relation with the outer shell 1, there being an annular space 7 between said shells. The upper end of the shell 6 extends up to the head 2 and is secured thereto. In the upper part of the tank is secured an annular perforated partition 8 that extends within the space 7 to provide an annular chamber 9 in the top of the tank.

A water supply pipe 10 has connection with the upper part of the tank through the head 2 so as to have communication with the space 11 within the inner shell, and a discharge pipe 12 has connection with said tank through a plugged opening 13 in the head 2 so as to have communication with the chamber 9. A by-pass pipe 14 has connection with said water supply pipe and said discharge pipe and is provided with a shut-off valve 15. The supply pipe 10 is provided with a valve 16 located between the connection of the by-pass and supply pipes and the connection of the supply pipe and the tank. The discharge pipe 12 has a valve 17, the connection of said by-pass pipe with the discharge pipe being located between said valve 17 and the connection of the discharge pipe with said tank. A pendant waste-pipe 18 has connection with the discharge pipe 12 between its valve 17 and the place of its connection with said tank, and is provided with a valve 19, there being a trap 20 of ordinary construction provided at the lower end of said waste pipe. A cross-connection 21 of piping is connected at one end with the supply pipe 10 at a point between the valve 16 and the place of connection of the supply pipe with said tank, and is connected at its opposite end with the waste pipe 18, there being a valve 22 provided for said cross-connection.

The cover 3 may be of any suitable construction for closing the opening in the top of the head 2 and is held in closed position by any suitable means such as a pivoted lever 23 provided with a clamp screw 24. The tank is provided at its lower end with feet 25 for its support, and the head 4 is provided with a plugged opeinng 26 for the removal of sediment from the bottom of the tank. Also, the inner shell 6 has fixed thereon a horizontally disposed flange 27 spaced from its lower end which serves as a deflector.

In the operation of the invention, a bed 28 of coarse gravel is placed upon the supporting plate 5 in the lower part of the tank, which bed extends up into the lower end of the inner shell and into the annular space 7 between said shells, and a bed 29 of comparatively finer gravel is arranged within the tank so as to overlie the former bed.

The flange 27 is preferably positioned slightly above the bed 29.

Within the inner shell, upon the bed 29 is placed a filtering body 30 consisting of sand or other suitable substance, the top of said filter body being spaced from the top of the tank, and in said space 7 encompassing the inner shell is placed a body of water softening materials, such as zeolites, or other suitable material.

The supply pipe 10 is connected with a suitable source of water under pressure (not shown) from which the water to be filtered and softened is derived, and the discharge pipe 12 is connected to the pipe (not shown) through which the filtered and softened water is distributed for final use.

The by-pass valve 15, waste-pipe valve 19, and cross-pipe valve 22, during normal operation of the machine are closed, while the supply pipe valve 16 and discharge pipe valve 17 are open. Thus, the water from the source of supply flows into the space 11 and passes downwardly through the filter bed and through the perforated supporting plate 5 into the space 5' in the bottom of the tank, and from thence upwardly through the gravel beds and body of zeolites in the space 7 and through the perforated ring 8 into the space 9 from which it passes through the discharge pipe in a filtered and softened condition.

When the filter bed becomes more or less clogged by the deposit of foreign matter detained from the normal flow of water through the apparatus, the bed may be relieved to a material extent from such deposits by closing the supply pipe valve 16 and discharge pipe valve 17, and leaving also the waste-pipe valve 19 closed, and opening the by-pass and cross-connection valves 15 and 22. With the valves thus adjusted water from the source of supply will flow through the by-pass pipe into the discharge pipe and from thence into the annular chamber 9 from which it is distributed through the perforated ring 8 into the annular space 7 in which it flows downwardly through the bed of zeolites and gravel beds and through the perforated plate 5 into the space 5' in the bottom of the tank. The water from said space passes upwardly through said plate, gravel beds and filter bed into the space 11 in the top of the tank and disturbs the previously deposited foreign matter so that it rises and flows with the water from the space 11 into the cross-connection 21 and is discharged through the waste-pipe. By protracting this back flow of water through the apparatus the filter bed is purged.

When the body of zeolites becomes ineffectual, and regeneration thereof is necessary to restore its normal condition, the by-pass valve 15 and cross-pipe valve 22 are closed, as are also the supply pipe valve 16 and discharge pipe valve 17. The waste pipe valve 19 is then opened so that the water is siphoned from the chamber 9 through the waste-pipe, causing the water in the upper part of the inner shell to recede when the cover 3 is removed. A quantity of salt is then deposited into the space 11 onto the filter bed after which the cover is replaced and the supply pipe valve 16 opened so that water from the source of supply will flow into the space 11 and through the deposit of salt, filter bed, gravel beds, zeolite body and into the chamber 9, from which chamber the water is discharged through the waste pipe 18. As the water thus flows through the apparatus the salt becomes dissolved and passes through and cleanses and regenerates the body of zeolites. The apparatus is then restored to normal operation by closing all of the valves except the supply pipe valve 16 and the discharge pipe valve 17 which are opened as in the first instance. The flange 27 on the inner shell is preferably located slightly above the uppermost gravel bed and has the function of diverting the water as it rises in the space 7 away from the inner shell toward the middle of the body of the softening mineral, so that tendency of the water to channel upwardly between said shell and body is circumvented.

What I claim is:—

1. In apparatus of the class described, a pair of shells concentrically disposed, there being an annular space therebetween; a head closing the upper ends of both shells having a central closed aperture; a head closing the lower end of the outer shell; a perforated plate in the lower end of the outer shell having supporting relation with the inner shell; gravel beds within the lower portions of said shells sustained by said plate; a filter bed within the inner shell overlying the gravel bed therein; a water softening mineral body within the annular space between said shells overlying the gravel bed therein; a perforated annular partition extending between said shells spaced from the uppermost head; a valve controlled water supply pipe having connection through the upper-pipe having connection through the upper-most head with the innermost shell; a discharge pipe having connection through the uppermost head with the space between said shells; a valve controlled waste pipe in connection with the discharge pipe; a valve controlled by-pass connection between said supply and discharge pipes; and a valve controlled cross-pipe connection, one end of which is connected with said waste pipe and the other end of which is connected with said supply pipe at a point between the valve thereof and its connection with said head.

2. In apparatus of the class described, a pair of shells concentrically disposed, there being an annular space therebetween; a head closing the upper ends of both shells having a central closed aperture; a head closing the lower end of the outer shell; a perforated plate in the lower end of the outer shell having supporting relation with the inner shell; gravel beds within the lower portions of said shells sustained by said plate; a filter bed within the inner shell overlying the gravel bed therein; a water softening mineral body within the annular space between said shells overlying the gravel bed therein; an annular deflector extending outwardly from the innermost shell positioned above said gravel bed; a valve controlled water supply pipe having connection through the uppermost head with the innermost shell; a discharge pipe having connection through the uppermost head with the space between said shells; a valve controlled waste pipe in connection with the discharge pipe; a valve controlled by-pass connection between said supply and discharge pipes; and a valve controlled cross-pipe connection one end of which is connected with said waste pipe and the other end of which is connected with said supply pipe at a point between the valve thereof and its connection with said head.

3. In apparatus of the class described, a pair of shells concentrically disposed, there being an annular space therebetween; a head closing the upper ends of both shells having a central closed aperture; a head closing the lower end of the outer shell; a perforated plate in the lower end of the outer shell having supporting relation with the inner shell; gravel beds within the lower portions of said shells sustained by said plate; a filter bed within the inner shell overlying the gravel bed therein; a water softening mineral body within the annular space between said shells overlying the gravel bed therein; a valve controlled water supply pipe having connection through the uppermost head with the innermost shell; a discharge pipe having connection through the uppermost head with the space between said shells; a valve controlled waste pipe in connection with the discharge pipe; a valve controlled by-pass connection between said supply and discharge pipes; and a valve controlled cross-pipe connection one end of which is connected with said waste pipe and the other end of which is connected with said supply pipe at a point between the valve thereof and its connection with said head.

4. In apparatus of the class described, a pair of shells concentrically disposed, there being an annular space therebetween; a head closing the upper ends of both shells having a central closed aperture; a head closing the lower end of the outer shell; a perforated plate in the lower end of the outer shell having supporting relation with the inner shell; a filter bed within the inner shell above said plate; a water softening mineral body within the annular space between said shells; a valve controlled water supply pipe having connection through the uppermost head with the innermost shell; a discharge pipe having connection through the uppermost head with the space between said shells; a valve controlled waste-pipe in connection with the discharge pipe; a valve controlled by-pass connection between said supply and discharge pipes; and a valve controlled cross-pipe connection, one end of which is connected with said waste pipe and the other end of which is connected with said supply pipe at a point between the valve thereof and its connection with said head.

5. In apparatus of the class described, a pair of shells concentrically disposed, there being an annular space therebetween; a head closing the upper ends of both shells having a central closed aperture; a head closing the lower end of the outer shell; a perforated plate in the lower end of the outer shell having supporting relation with the inner shell; a filter bed within the inner shell above said plate; a water softening mineral body within the annular space between said shells; a perforated annular partition extending between said shells spaced from the uppermost head; a valve controlled water supply pipe having connection through the uppermost head with the innermost shell; a discharge pipe having connection through the uppermost head with the space between said shells; a valve controlled waste-pipe in connection with the discharge pipe; a valve controlled by-pass connection between said supply and discharge pipes; and a valve controlled cross-pipe connection, one end of which is connected with said waste pipe and the other end of which is connected with said supply pipe at a point between the valve thereof and its connection with said head.

6. In apparatus of the class described, a pair of shells concentrically disposed, there being an annular space therebetween; a head closing the upper ends of both shells having a central closed aperture; a head closing the lower end of the outer shell; a perforated plate in the lower end of the outer shell having supporting relation with the inner shell; a filter bed within the inner shell above said plate; a water softening mineral body within the annular space between said shells; an annular deflector extending outwardly from the innermost shell spaced above the lower end thereof; a valve controlled water supply pipe having connection through the uppermost head with the innermost shell; a discharge pipe having connection through the uppermost head with the space between said shells; a valve controlled waste-pipe in connection with the discharge pipe; a valve controlled by-pass connection between said supply and discharge pipes; and a valve controlled cross-pipe connection, one end of which is connected with said waste pipe and the other end of which is connected with said supply pipe at a point between the valve thereof and its connection with said head.

7. In apparatus of the class described, a closed tank; a tubular shell extending from the top of said tank to a point therein adjacent the lower end thereof, said shell and tank having communication with each other at their lower ends; a lid in the upper head of said tank through which communication is had to within said shell at the upper end thereof; a filter bed within said shell; a water softening mineral body within the tank surrounding said shell; a valve controlled water supply pipe having connection through the uppermost head with the innermost shell; a discharge pipe having connection through the uppermost head with the space between said shells; a valve controlled water pipe in connection with the discharge pipe; a valve controlled by-pass connection between said supply and discharge pipes; and a valve controlled cross-pipe connection, one end of which is connected with said waste pipe and the other end of which is connected with said supply pipe at a point between the valve thereof and its connection with said head.

8. In a water filtering and softening appliance, a tank having chambers therein, in one of which chambers is disposed a filter bed; and in the other of said chambers is disposed a body of water softening material; a valve controlled system of piping in connection with said tank including a water supply pipe, a distributing pipe, and a waste pipe, said system of piping being so arranged that water from the supply pipe may be caused to course successively through the filter bed and water softening body and become expelled through the distributing pipe, or, successively from the supply pipe through the water softening body and the filter bed, and become discharged through the waste pipe, or, successively from the supply pipe through the filter bed and water softening body and become expelled through said waste pipe; and means for introducing into said tank regenerating material for said softening body.

9. In a water filtering and softening appliance, a tank having chambers therein, in one of which chambers is disposed a filter bed; and in the other of said chambers is disposed a body of water softening material; a valve controlled system of piping in connection with said tank including a water supply pipe and a distributing pipe, said system of piping being so arranged that water from the supply pipe may be caused to course successively through the filter bed and water softening body and become expelled through the distributing pipe, or, successively from the supply pipe through the water softening body and the filter bed and become discharged through the distributing pipe; and means for introducing into said tank regenerating material for said softening body.

10. In a water softening appliance a tank having chambers therein, in one of which chambers is disposed a body of water softening material; means for supplying to the other of said chambers regenerating material for said softening body; and a valve controlled system of piping in connection with said tank including a water supply pipe, a distributing pipe, and a waste pipe, said system of piping being so arranged that water from the supply pipe may be caused to course successively through said other chamber and the water softening body and become discharged through the distributing pipe, or, successively from the water supply pipe through said other chamber and the water softening body and become discharged through said waste pipe.

11. In a water softening appliance a tank having chambers therein, in one of which chambers is disposed a body of water softening material; means for supplying to the other of said chambers regenerating material for said softening body; and a valve controlled system of piping in connection with said tank including a water supply pipe and a distributing pipe, said system of piping being so arranged that water from the supply pipe may be caused to course successively through said other chamber and water softening body and become expelled through the distributing pipe.

In testimony whereof I affix my signature.

RALPH C. DUNKELBERG.